United States Patent [19]

Johnson

[11] Patent Number: 4,470,681

[45] Date of Patent: Sep. 11, 1984

[54] METHOD OF AND APPARATUS FOR DETECTING RANGE USING MULTIPLE RANGE READINGS

[75] Inventor: Bruce K. Johnson, Andover, Mass.

[73] Assignee: Polaroid Corporation, Cambridge, Mass.

[21] Appl. No.: 415,531

[22] Filed: Sep. 7, 1982

[51] Int. Cl.³ .............................................. G03B 3/10
[52] U.S. Cl. .................................................. 354/403
[58] Field of Search ................... 354/25 R, 25 A, 403

[56] References Cited

U.S. PATENT DOCUMENTS

| Re. 27,461 | 8/1972 | Harvey | 95/44 C |
|---|---|---|---|
| 1,866,581 | 7/1932 | Simjian | |
| 3,442,193 | 5/1969 | Pagel | 95/44 |
| 3,560,647 | 2/1971 | Harmon | 178/7.2 |
| 3,618,499 | 11/1971 | Harvey | 95/45 |
| 3,723,003 | 3/1973 | Vockenhuber et al. | 356/4 |
| 3,736,057 | 5/1973 | Harvey | 356/4 |
| 3,758,209 | 9/1973 | Harvey | 356/4 |
| 3,945,023 | 3/1976 | Stauffer | 354/25 |
| 4,047,187 | 9/1977 | Mashimo et al. | 354/23 D |
| 4,065,778 | 12/1977 | Harvey | 354/25 |
| 4,150,888 | 4/1979 | Filipovich | 354/25 |
| 4,171,885 | 10/1979 | Kondo | 354/25 |
| 4,199,246 | 4/1980 | Muggli | 354/195 |
| 4,230,400 | 10/1980 | Wick et al. | 354/25 |
| 4,288,152 | 9/1981 | Matsuda | 354/25 |
| 4,298,258 | 11/1981 | Matsuda et al. | 354/25 |
| 4,313,654 | 2/1982 | Matsui et al. | 354/25 |
| 4,320,946 | 3/1982 | Aoki et al. | 354/25 |
| 4,341,447 | 7/1982 | Biber | 354/25 |
| 4,341,464 | 7/1982 | Vola | 355/16 |
| 4,362,372 | 12/1982 | Kiesel | 354/195 |
| 4,381,149 | 4/1983 | Hair et al. | 356/4 |

OTHER PUBLICATIONS

Hamamatsu Technical Notes No. TN-003, Oct. 1981.
The British Journal of Photography, "Automatic Focus Control", by B. A. Scott, Apr. 1982.
The British Journal of Photography, "Honeywell Visitronic Auto/Focus System, Nov. 4, 1977.

Primary Examiner—Russell E. Adams
Attorney, Agent, or Firm—Leslie J. Payne

[57] ABSTRACT

A method of and system for ranging are disclosed. The method and system transmit ranging energy toward different portions of a scene and sense ranging energy reflected from the different scene portions. Included is a step or means responsive to the sensing for detecting the ranges of the different scene portions.

38 Claims, 4 Drawing Figures

METHOD OF AND APPARATUS FOR DETECTING RANGE USING MULTIPLE RANGE READINGS

BACKGROUND OF THE INVENTION

The present invention, in general, pertains to a method of and apparatus for automatically deriving range information. More particularly, it relates to a method of and apparatus for automatically establishing a plurality of range readings for different portions of a scene and for controlling photographic operations as a function of these readings.

In the photographic arts, various systems have been proposed for deriving range information usable for controlling photographic functions. Typically in such systems energy is transmitted to an object and the reflected energy is detected. Characteristics of the transmitted and reflected energy are contrasted for purposes of deriving a signal representative of the subject-to-system distance. The resultant range signal can be used for purposes of controlling such functions as focusing, flash firing and exposure.

One known ranging system of the above type utilizes acoustic pulses for determining the object-to-system distance. In this kind of autofocusing system, the elapsed time between transmission and receipt of an ultrasonic signal, which is bounced off the object, is utilized for deriving a range signal. This signal is usable for driving a lens element of a lens assembly to a correct focal position corresponding to the distance the object is from the camera so that such object may be properly focused. Commonly-assigned U.S. Pat. No. 4,199,246, entitled "Ultrasonic Ranging System for a Camera", is representative of such systems.

Another known ranging technique relies upon the concept of triangulation. An example of an active triangulation ranging system is employed in Canon's AF 35M camera. In this connection, an infrared-emitting diode shifts laterally, during a measuring cycle, relative to a fixed sensor cell which monitors the maximization of the reflected infrared radiation. The distance the emitter diode travels to provide such maximization is related to the subject distance. Correspondingly, a range signal is derived for adjusting focusing of a lens assembly.

Another known type of active triangulation system is that in which use is made out of a position sensitive photodetector. In such system, a ranging beam is aimed at the object of interest. The beam reflected from the object strikes the position sensitive photodetector and results in voltage outputs from opposite ends thereof. The voltage output ratio is proportional to object distance and can be converted into a ranging signal for control of, for instance, focusing.

There are other types of ranging systems employing triangulation, for instance, those disclosed generally in U.S. Pat. Nos. 3,736,057 and 4,150,888. The concept of triangulation is also employed in a passive type optical ranging system such as the type utilized in Honeywell's Visitronic system; and described basically in U.S. Pat. No. 3,945,023. This system compares the voltage outputs of two five-panel photosensor arrays. A moving mirror scans the image. The system includes two mirrors, one fixed and one movable. When the system's integrated circuit detects matching voltage patterns from both arrays, it can calculate the range for directing the lens element to the proper focal position corresponding to subject range.

The foregoing described autofocusing systems have improved significantly amateur photography. By providing for point-and-shoot photography, these autofocusing systems have eliminated what is for most people the hardest part of photography--focusing. While these systems have performed highly satisfactorily, they nonetheless have certain shortcomings. Most notably, each of the noted active systems requires that the source of transmitted energy be properly aimed at the object sought to be in-focus. Otherwise, of course, the resultant photograph will be out-of-focus. Aiming is made more difficult because the source of transmitted energy is normally a narrow beam. Thus, proper focusing is a function of rather precise aiming. Hence, it is not always achieved easily.

Furthermore, there are other limitations. For example, if one subject is in the foreground with another subject in the background, in all probability only one of the two subjects will be in-focus. Thus, these systems do not provide means for ranging which accommodates for scenes in which background and foreground subjects are at different distances. Moreover, the focusing is locked into the range signal generated by a single subject. This is limiting because photographers cannot focus closer than or beyond a subject of interest. While photographers have been known to focus closer than or beyond a subject of interest for depth of field purposes, such focusing is done manually. Commonly-assigned and copending application Ser. No. 244,964, filed Mar. 18, 1981, discloses a ranging system in which the objective lens is focused automatically to a point beyond the subject in accordance with available subject illumination.

From the above, it will be appreciated readily that known autofocusing systems provide extremely significant improvements over the more traditional methods of camera focusing, but they nevertheless are limited in several important respects as mentioned above.

SUMMARY OF THE INVENTION

It is an object of the present invention to provide for an improved method of and system for range detecting.

In this regard, such range detecting is achieved by a ranging system including means for transmitting ranging energy toward different portions of a scene, and means for sensing ranging energy reflected from the different scene portions. Included is means responsive to the sensing means for facilitating determination of the ranges of the different scene portions. In one embodiment, the responsive means includes means for deriving a selected range signal based on the several scene portion ranges for facilitating control of an apparatus.

In one illustrated embodiment, there is provided an active ranging system comprising means for scanning at least a narrow beam of energy across a scene for determining the range from the system of scene portions lying along the scanning path. Included are means for receiving the ranging energy reflected from such scene portions. The receiving means includes an energy sensing device, and means for distributing such ranging energy along this device so that energy reflected from all scene portions substantially equidistant from the system are received at substantially the same location on the device while ranging energy from scene portions non-equidistant from said system are spatially distributed along the extended direction of the device, whereby the distance to any given scene portion is solely a function of the location of its reflected energy on the device.

The distributing means includes a lens mounted over the device for focusing the reflected energy on the device and means for providing relative movement between the lens and the device in coordinated relation to scanning of the beam so as to produce the same location of energy from equidistant scene portions and distributed locations of energy from non-equidistant scene portions. The scanning means includes an energizeable source of energy, a lens for facilitating focusing of the narrow beam, means for providing relative movement between the source and the lens so as to scan the beam across the scene. Means are provided for coupling the scanning means and the distributing means to coordinate relative movement thereof.

In another illustrated embodiment, the determining means can provide a selected range which is a function of the average of the derived ranges of the different scene portions or can provide selected range signals which are weighted in a desired fashion. For instance, the selected range signal could be a compromise between the range of the nearest scene portion and farthest portion and biased in favor of the nearest scene portion.

It is an object of the present invention to make provision for an improved automatic ranging system; the provision of an improved automatic ranging system for controlling photographic functions; the provision of an improved automatic ranging system for controlling focusing; the provision of an improved automatic ranging system for transmitting ranging energy to a plurality of portions of a scene and sensing the reflected ranging energy for determining the range to each of these different scene portions; the provision of an improved automatic ranging system for deriving a selected range signal based on the several range signals; the provision of an improved automatic ranging system wherein the selected range signal can be a compromise between the nearest and farthest object ranges; the provision of an improved automatic ranging system wherein the selected range signal can be the average range of the several range signals; the provision of an improved automatic ranging system wherein the selected range signal can be a compromise range which is weighted in favor of the nearest or farthest object ranges; the provision of an improved optical ranging system wherein a ranging beam is caused to scan a scene along a predetermined scanning path and the reflected beams strike a position sensitive photodetector extending in a direction generally parallel to the scanning path as a function of the range of the objects which reflect the ranging beam, whereby objects equidistant to the ranging system strike the photodetector at the same location; the provision of an improved optical ranging system of the last-noted kind, wherein a scanning assembly includes a pair of identical lens elements, each one moving simultaneously relative to an energizeable source of energy and the photodetector and at a distance therefrom so as to insure positional coincidence for reflected ranging beams striking the photodetector from objects equidistant from the photodetector; the provision of an improved method of automatically ranging; the provision of an improved method of ranging for controlling photographic functions including focusing; the provision of an improved method of ranging by transmitting ranging energy to different portions of the scene and sensing the reflected energy for determining range related information about each of said portions; the provision of an improved method of ranging, whereby the range information derived by the last-mentioned method can be used to establish a selected range signal; the provision of an improved method of the last-noted type wherein the selected range signal controls a photographic function, such as focusing, in accordance with the nearest object, farthest object, or the average range of objects in the scanning zone; and, the provision of an improved method wherein ranging energy is scanned along a scanning path and the energy reflected from objects equidistant from a position sensitive photodetector are positionally coincident thereon and objects not equidistant from the photodetector strike thereon along the extended direction thereof as a function of their distance.

These and other objects and further scope of applicability of the present invention will become apparent from the detailed description to follow when taken in conjunction with the accompanying drawings wherein like parts are designated by like reference numerals throughout the several views.

DETAILED DESCRIPTION

The present invention is related to an active range detecting system operable for deriving range information from various portions of the scene. A selected range signal is generated and usable for controlling a variety of functions including photographic functions, such as focusing. The embodiment to be described is related to the control of focusing in a photographic apparatus. It will be understood, however, that it can be used for controlling other photographic functions. For instance, it could control flash firing and exposure functions. Although the ranging system to be described is useful in a still camera, it can be used in a movie camera as well. Although a ranging system using electromagnetic energy is disclosed, this invention contemplates use of acoustical energy for deriving the range information.

Figure 2:
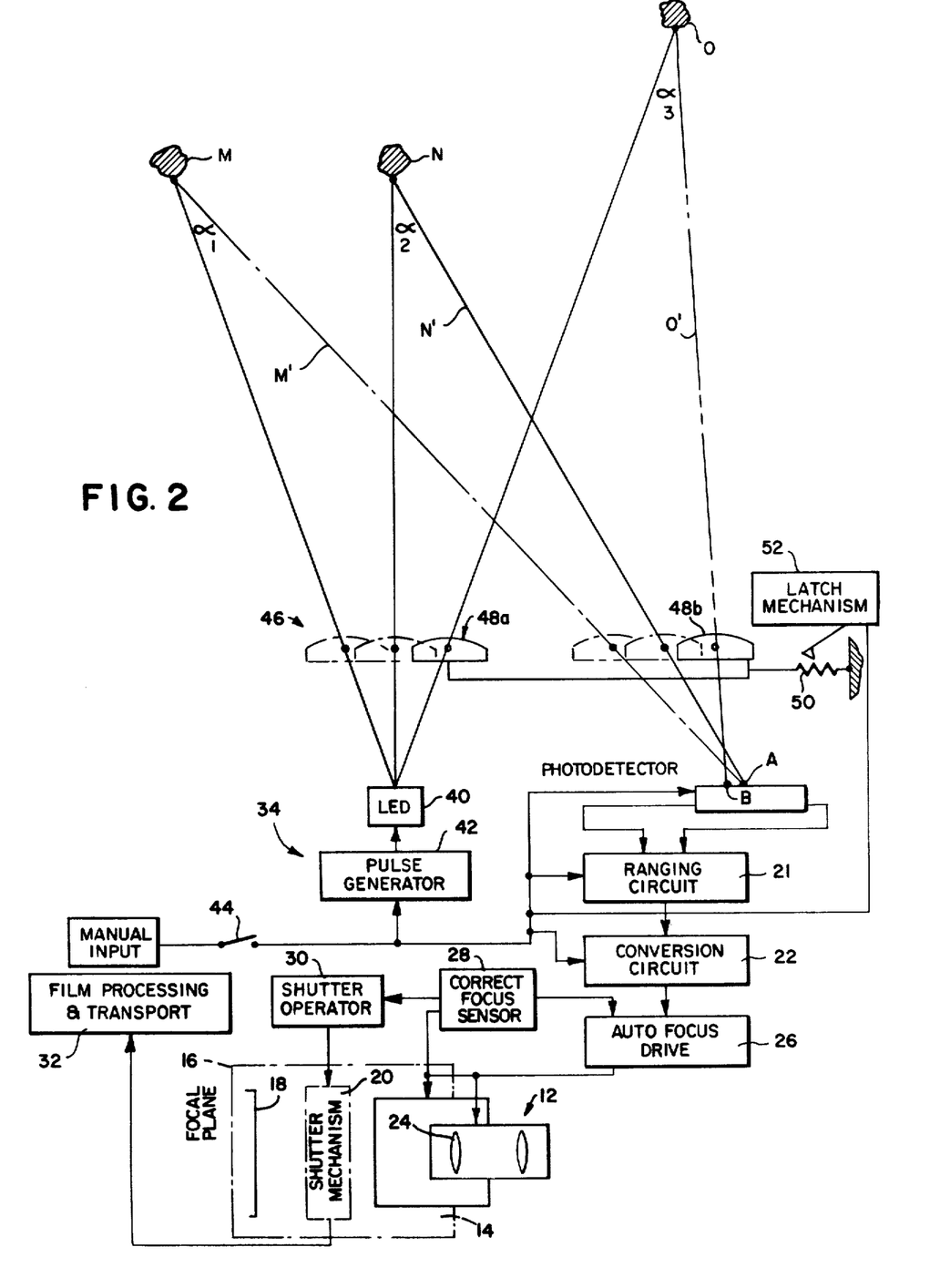
FIG. 2 is a schematic representation of a ranging system made in accordance with the present invention and shown usable as part of an autofocusing system of a photographic apparatus.

Referring to FIG. 2, there is depicted in schematic form an active optical range detecting system indicated generally by reference numeral 10. The ranging system 10 is usable for controlling a variable focus lens assembly 12 of a photographic camera apparatus 14. The camera 14 is of the type that has a housing 16 within which film (not shown) is mounted at a focal plane 18. The film may be of the self-developing type, such as the kind manufactured by the Polaroid Corporation, Cambridge, Mass. The focal plane 18 is in the optical path of the lens assembly 12. Control of the scene light to the film plane 18 is effected by a shutter mechanism 20. The shutter mechanism 20 is interposed between the lens assembly 12 and the film plane 18 and can be of the type which determines exposure time and aperture size in accordance with light from the scene being photographed.

As will be described in greater detail, the range detecting system 10 determines a selected range signal from a plurality of range related values corresponding to different scene portions. Once the selected range signal has been determined by a ranging circuit 21, it is fed to a range-to-unit displacement converter 22. The converter 22 compensates for the non-linear relationship between the axial position of a positionable lens element 24 of the variable focus lens assembly 12 and the different ranges. Once this conversion is complete, a lens drive signal is sent to the autofocus drive means 26. Upon receipt of the lens drive signal, the autofocus drive 26, which includes a motor and gear train (not shown), generates a lens actuating force which is applied to lens element 24 for advancing the latter. At this point in time, the lens element 24 starts to move toward the in-focus position as determined by the ranging system 10. There is provided a correct focus sensor 28 which monitors the actual position of the lens element 24. When the lens element 24 is correctly positioned at the desired focal position, the correct focus sensor 28 sends an automatic lens drive termination signal to the autofocus drive 26. In addition, the correct focus sensor 28 sends simultaneously an exposure initiate signal to the shutter operator control 30. In turn, the shutter operator 30 trips the shutter mechanism 20 to drive the latter to its unblocking condition. The shutter mechanism 20 will complete an evaluation period, once an exposure control system (not shown) is activated so as to cause the shutter mechanism to return to its original blocking position. After the shutter mechanism 20 has completed its operation, a signal is sent to the film processing and transport cycle mechanism 32 within the camera 14 for initiating the latter's operation.

Referring back to the ranging system 10, it is seen to include a source assembly 34 and a sensing assembly 36. The source assembly 34 is actuatable to provide pulsed beams of electromagnetic energy. Towards this end, there is included a stationary light-emitting diode LED 40 which is periodically pulsed a number of times by a pulse generator 42 within a measured cycle. The pulse generator 42 is actuated in response to the closing of a ranging switch 44. This closing connects the pulse generator 42 to a suitable source of power (not shown). The LED 40 emits narrow beams of collimated infrared spectral energy. Spectral frequencies other than infrared may be used. However, infrared is utilized for a number of reasons among which it does not disturb the scene, and the effect of ambient scene illumination or "scene noise" is minimized greatly. Although this embodiment describes use of pulsed narrow beams, the source assembly 34 may produce a continuously illuminated narrow beam, which can be scanned across the scene so as to provide range readings for every portion of the scene which has been scanned. For causing scanning of the pulsed beams along a scanning path, the source assembly 34 is operated in conjunction with the scanning assembly 46.

Included in the scanning assembly 46 is a pair of identical lens elements 48a,b which have the same optical properties (e.g., focal length) and are joined together as indicated at 49 in spaced apart relationship. The lens elements 48a,b are mounted for movement transverse to their optical axes. In this embodiment, the lens elements 48a,b are driven relative to the stationary LED 40 and the sensing assembly 36; respectively, by a mechanically tensioned spring schematically shown at 50. This driving spring 50 is latched in a stored energy condition by a latched pawl mechanism 52. In response to the ranging switch 44 being closed, the latch mechanism 52 is operated to release the spring 50. As a result, the lens elements 48a,b traverse the LED 40 and the sensing assembly 36; respectively. Suitable means, such as a solenoid, not shown, can be provided to return the lens elements to their latched position upon termination of the scanning cycle. Also, the present invention contemplates that the latch mechanism 52 need not release the spring 50 during the ranging mode. In this connection, the range detecting system would be versatile because it could be used in the manner of the present invention or, with the lens elements 48a,b being held stationary by the latch mechanism, it could function as a known ranging system. Of course, in the latter case only a single pulse would be necessary for deriving range information.

Figure 1:
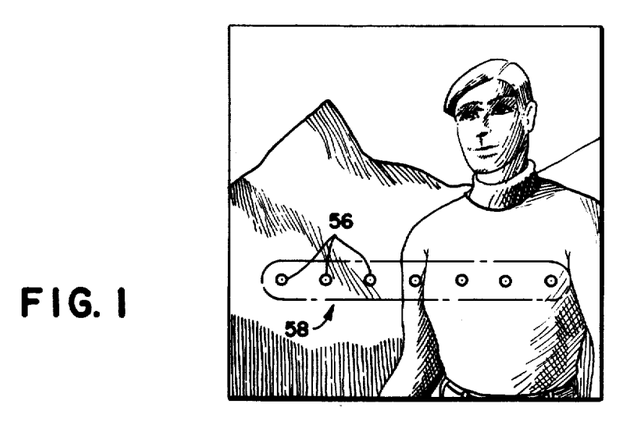
FIG. 1 a schematic representation of a scene to be ranged including a scanning zone with a plurality of ranging spots therein.

As shown in FIG. 1, the pulsed beams define an array of several discrete ranging spots 56 which are encompassed in a generally horizontal range zone 58 of the scene to be ranged and photographed. In this embodiment, a centrally located and generally horizontal array is used because the objects of photographic interest will usually be clustered in and adjacent the center of the scene.

For controlling the extent of the array and the spread between beam spots 56, the LED 40 is pulsed at a predetermined rate which in conjunction with a preselected speed of movement of the lens elements 48a, b determines the extent of the array and the beam spot spread. Although not shown in this embodiment, the beam array may be vertical or even have an angular orientation with respect to the scene. Furthermore, although the beam array is shown generally linear, the array need not follow a linear pattern. Spreading of the pulsed ranging beams 38 is normally accomplished so that there is a relatively high probability that the object or objects to be ranged and photographed are encompassed within the field of interest.

Reference is made back to sensing assembly 36. The sensing assembly 36 includes position sensing device such as, a single-axis position sensitive photodetector (PSD) 54 of the kind commercially available from, for instance, the Hamamatzu Company of Japan. Position sensitive photodectors of this type provide position information of a light spot thereon. In this regard, the photodetector 54 has a continuous strip of microphotosensitive regions (not shown). When the photodetector 54 is struck by a ranging beam reflected from an object, it will simultaneously transmit voltages to the opposite ends thereof. The ratio of voltages, for each reflected beam, at opposite ends of the photodetector 54 is proportional to the angle $\alpha$ between the emitted beam and the reflected beam (FIG. 2). This angle $\alpha$ is proportional to the distance the reflected object is from the ranging system 10. The present invention also contemplates use of other position sensing devices, such as closely spaced array of charge coupled devices (CCDs).

For the practice of this embodiment, it is important to have ranging beams, reflected from objects equidistant to the ranging system, strike the photodetector 54 at the same location. In this manner, the ratio of voltages will be the same for each coincident reflected beam. This is best illustrated in FIG. 2, wherein each reflected ranging beam M' and N' is reflected from objects M, N; respectively, and strike the photodetector 54 surface at the same location A. In this case, the angles $a_1$ and $a_2$ are proportional to object distance and are equal to each other. This is in contrast to the reflected beam O' which strikes the photodetector surface at a different location B. This is because the object O is non-equidistant with the objects M, N. In this case, the ratio of voltages at the opposite ends of the photodetector for reflected beam O' is different than for reflected beams M', N'. This different voltage ratio is proportional to the angle $a_3$ which is, in turn, proportional to the distance the object O is from the ranging system. As noted, variances in voltage ratios are proportional to variances in object distance. Stated somewhat differently, energy reflected from all scene portions substantially equidistant from the system are received at the same location on the photodetector, while ranging energy from scene portions non-equidistant from the system are spatially distributed along the extended direction of the photodetector, whereby the distance to any given scene portion is solely a function of the location of its reflected energy on the photodetector.

Towards the end of assuring the relationship that objects equidistant from the ranging system reflect the ranging beams to the same location on the photodetector, the source assembly 34, the sensing assembly 36 and the scanning assembly 46 are arranged in a preselected manner. In this regard, the LED 40 and the photodetector 54 are in the same plane and have a predetermined base line spacing therebetween. Also, both the LED 40 and the photodetector 54 are spaced from the respective lens elements 48a,b so as to be in the respective image forming planes of these lenses. As noted earlier, the lens elements 48a,b have the same focal length and are otherwise optically identical. To further insure that reflected beams from an object or objects equidistant from the ranging system 10 are positionally coincident on the array of the photodetector 54, both lens elements 48a,b are simultaneously driven at the same speed relative to the LED 40 and the photodetector 54.

As noted, this shifting of the lens element 48a provides for a scanning of the emitted pulsed ranging beams. Since the lens element 48b synchronously moves with the lens element 48a, the former compensates for the fact that the emitted ranging beams are laterally shifted so that all reflected beams coming from objects substantially equidistant from the system 10 will be positionally coincident on the photodetector.

In the present embodiment, both the LED 40 and the photodetector 54 are depicted as being stationary. However, this invention contemplates that the reverse can happen. That is, both the LED 40 and the photodetector 54 can be displaced simultaneously and at the same rate while the lens elements 48a,b are held stationary.

As noted previously, there is a specified relationship existing between the source, sensing and scanning assemblies which allow reflected beams from substantially equidistant objects to be positionally coincident on the face of the photodetector 54. While that relationship is significant when a beam is scanned, it is not necessary to achieve the benefits of the present invention if the beam is not scanned. Further in this regard, it will be understood that the lens elements 48a,b need not have the same optical properties, such as focal length. Also, the lens elements 48a,b need not move at the same speed or be stationed at the same distances from the LED 40 and the photodetector 54. It is within the scope and spirit of this invention, for instance, that the LED 40 could rotate for scanning purposes, while the photodetector 54 is displaced linearly. Of course, the rotation and linear displacement would be correlated with respect to each other so that there would be positional coincidence on the photodetector 54 of beams reflected from objects equidistant from the ranging system. This invention contemplates a wide variety of structures, and functional arrangements for effecting scanning can be used so long as the positional coincidence mentioned above is maintained. What is necessary, regardless of the changes made to this embodiment, is that reflected beams be positionally coincident on the surface of the photodetector for all objects equidistant from the ranging system 10. Thus, any changes made to the relationship of the noted assemblies would have to be compensated for so as to achieve this positional coincidence. Moreover, as mentioned, the invention contemplates that the LED 40 and the photodetector 54 move in a generally linear fashion while the lens elements 48a,b are stationary.

Figure 3:
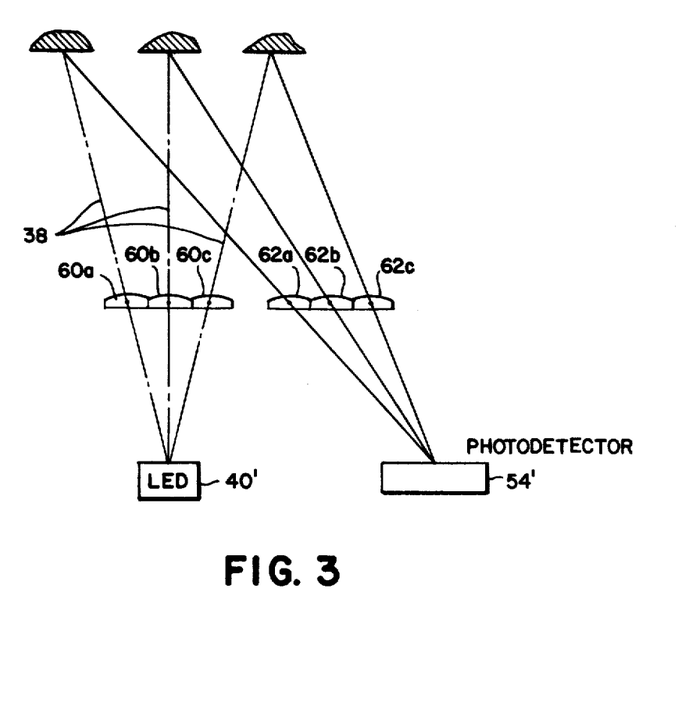
FIG. 3 is a schematic representation of an alternate embodiment made in accordance with the present invention.

The foregoing description has been centered about having the ranging beams scanned in a predetermined path. Reference is now made to FIG. 3 for showing another embodiment. This one differs from the former insofar as the ranging beams are not scanned for purposes of directing them to multiple spots in the scene. Rather, multiple stationary lenses 60a-c are positioned in a linear array in front of the LED 40', while a linear array of multiple stationary lenses 62a-c are positioned in front of the photodetector 54'. Because of the multiple array of lenses 60a-c, an emitted ranging beam will be directed simultaneously to three different spots in the scene. As illustrated, the three lenses 62a-c are positioned in front of the photodetector 54' so that reflected beams from an object or objects equidistant from the ranging system strike the photodetector at the same position. Towards this end, the lens elements 60a-c are suitably spaced apart with respect to each other and to spaced-apart lenses 62a-c so that a ranging beam directed by the lens 60a cooperates only with the lens 62a, whereas a beam directed by the lens 60b cooperates only with the lens 62b, while a beam directed by the lens 60c cooperates only with the lens 62c. The spacing of the lenses shown in FIG. 3 is for illustration purposes only. Because of this arrangement, a beam from one of the emitting lenses 60a-c will not be reflected to other than the intended respective one of the lenses 62a-c. Obviously, any number of lenses may be used so long as the above conditions are met.

Further in this regard, the present invention contemplates that multiple ranging signals may be generated by a plurality of spaced-apart acoustic rangefinding systems, such as the kind disclosed in commonly-assigned U.S. Pat. No. 4,199,246, entitled "Ultrasonic Ranging System for a Camera", by J. Muggli. For instance, there could be a plurality of ultrasonic transducers for transmitting relatively short bursts of ultrasonic frequencies and a corresponding number of synchronized receivers for processing echo signals produced by the transducer upon receipt of an echo after a predetermined time. Further in this regard, there would be a means for deriving a selected range signal which is based on the plurality of range signals of the acoustic ranging means and which would be used for driving the lens element to a focal position corresponding to the selected range signal. A better approach would be to have a single transducer rotated and operated to provide periodic bursts of ultrasonic frequencies. The time interval between bursts would be adequate to allow processing of echo signals for each burst so as to provide range information for each burst.

Returning back to the active optical ranging system 10, the ranging circuit 21 can process the voltage ratio of each pulsed beam in a variety of ways to produce a selected range signal for controlling photographic functions. The ranging circuit 21 may comprise a pair of capacitors (not shown) which capacitively store the voltages from respective ends of the photodetector 54 in response to the incident reflected ranging beams. At the conclusion of the repetition of pulses, established by the pulse generator 42, the outputs from the ends of the photodetector 54, which are capacitively stored for a specified reception time following ranging commencement, are compared by a suitable analog type comparator (not shown). The resulting ratio of voltages is a selected range signal which is the average range of objects which are within the scanned zone 58. If the ranging beam is directed at the sky, for instance, there will be no reflected beam. Thus, there will be no voltage ratio, and the circuit will treat this as an infinity reading. This selected range signal is, in turn, transmitted to the range-to-unit conversion circuit 22 which, of course, operates the autofocus drive 26 for displacing the lens element 24 to an appropriate focal position corresponding to the derived selected range signal. It is pointed out, of course, that the ranging circuit 21 instead of using analog components could use components which digitalize the operation of the ranging circuit. In fact, a combination of digital and analog components may be used.

Figure 4:
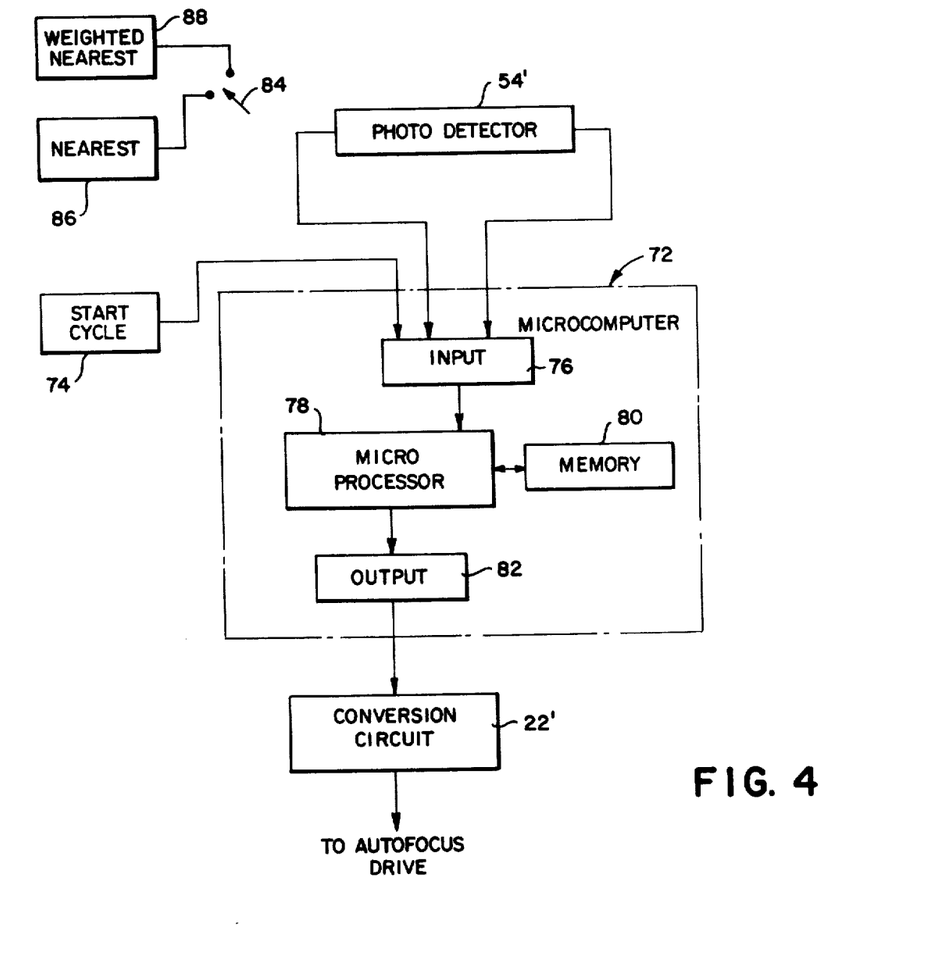
FIG. 4 is a schematic representation of another embodiment of the present invention.

Reference is now made to FIG. 4 for showing another embodiment made in accordance with the present invention. This embodiment differs from the other insofar as it is provided with a different ranging circuit designated generally at 70. The ranging circuit 70 can provide a variety of selected range signals. For instance, such a selected range signal could be a compromise range signal between the nearest or farthest objects in the ranging zone and be biased toward the nearest object or, for that matter, biased toward the farthest object. The present invention is extremely versatile because the range signal can be selectively weighed in a variety of ways. For instance, the selected signal could be weighted to favor preselected portions of the scene. In other words, the signal would give greater value to objects in the left, center or even right side of the scene.

The ranging circuit 70 includes a microcomputer schematically indicated at 72. The operation of the microcomputer 72 can be responsive to a plurality of inputs including a cycle start input 74 operable in response to closing of the ranging switch 44. Other inputs will include the pair of voltage outputs from opposite ends of the photodetector 54'. The microcomputer 72 includes an input device or buffer 76 for storing and feeding the previously-noted inputs in appropriately encoded form to the microprocessor unit 78. The microprocessor 78 interacts with a read only memory (ROM) 80 which stores a program defining the microcomputer's operating instructions and a program which will manipulate the inputs from the buffer 76. The ROM 80 can determine the ratio of voltage outputs for each received beam incident on the photodetector 54'. As noted, this ratio is proportional to the distance an object is from the ranging system 10. If a ranging beam is not reflected back to the photodetector 54', the microprocessor 78 will treat that as an object being at infinity. With a range determined for each reflected beam, the program could then determine the average range of objects in the scanning path. Obviously, a variety of programs can be employed. For instance, the ROM 80 could assign different weights for different portions of the scene. The selected range signal which is weighted accordingly would then be fed to a buffer or output device 82 for feeding the selected range signal to the range-to-unit conversion circuit 22'. The autofocus drive would then be operated for displacing the lens element to a focal position corresponding to the selected range signal. The above example is, of course, given for purposes of illustration and not limitation. Also, the ROM 80 can be programmed to distinguish between the nearest or farthest object or the nearest or farthest large object or objects in between. It is seen that the plurality of range readings can be manipulated in a suitable fashion to generate a selected range signal for achieving a variety of ends.

The present invention contemplates use of mode selection switch 84 which provides versatility to a user. In other words, the user would not have to rely upon the program in the ROM 80, but could selectively input the microprocessor 78. For instance, the mode selection switch 84 would selectively input the microprocessor 78 with instructional programs from instructional programs of several ROM's, two of which are shown at 86, 88, respectively. These programs would control the kind of program the microprocessor 78 would use to determine the selected range signal. The mode switch 84 would override the program of the ROM 80 and would change the selected range signal based on a desired program established by the ROM' 86, 88. For instance, the ROM 86 would establish a compromise range signal which is between the nearest and farthest objects, but weighted towards the nearest object. Thus, focusing, for instance, would be weighted in favor of this compromise. The ROM 88 would select the nearest range signal for purposes of focusing. Obviously, a variety of range signals can be selected based on factors, such as object distances and portions of the scene. For instance, an ROM could select the farthest object, the nearest or farthest large object, or derive a compromise range signal between the nearest and farthest objects which is based towards the farthest object. Advantageously, the user can thus automatically have the lens set at a focal position which is of his or her choosing.

Since the range signals are derived by triangulation techniques, the reflectivity factors of the objects will not affect adversely the range information providing the individual reflected pulses are analyzed and stored separately. This is because it is the position of the reflected beam which determines range and not intensity. The foregoing description has been directed to the use of the ranging signals controlling the focal position of the lens element. As indicated earlier, the ranging signals can be used for controlling exposure and flash fire. In this regard, the selected range signal can be used for generating a timing signal proportional to the selected range signal for controlling flash and exposure. The time signal would be stored and triggered to start timing a readout of the microcomputer output 82, when the scanning shutter provides initial coincidence of some portion of taking apertures over the exposure path. A first light detect (not shown) is preferably employed to provide such a readout signal. The timed interval is then fed to a flash fire timer (not shown) which is configured to produce a flash trigger signal at the end of the interval and thereby fire a flash in synchronism with an aperture selected in accordance with the selected range signal. The illustrated shutter mechanism can provide progressively enlarging aperture values during its opening phase, and the timed interval for flash fire is made inversely proportional to the distance of the selected range signal.

The foregoing embodiments may be modified to utilize the selected ranging signal in conjunction with a quench timer unit (not shown) which develops a quench interval or time which, in accordance with the selected range signal determines the duration of the strobe illumination developed by a flash unit (not shown). The flash unit is to be fired at a fixed time controlled by a flash fire unit (not shown) at any appropriate aperture defined by the shutter mechanism. Thus, the total amount of flash is controlled by the weighted range signal. Hence, the ranging circuit and the quench timer unit would provide a predetermined contribution of the artificial illumination to the exposure.

With further regard to control of the flash contribution to the exposure, the selected range signal may be utilized for presetting the aperture area to a predetermined value before firing of the pulse of illumination. Further, although the foregoing description of flash control centers upon inclusion of the ranging apparatus and the control elements primarily in the camera, either or both can be operatively associated with the flash unit, per se, for controlling some of the noted photographic functions.

As noted, the range information can be used in a variety of ways. Further in this regard, such information can improve depth of field. In such a situation, the lens would be placed at an ideal focal position, whereat the nearest object is at the near edge of the focus zone. This will tend to enhance sharpness of the objects behind the near object. For example, with a conventional 35mm camera, the operator would set an aperture, the ranging system of the present invention would scan the subject field, and range information for each pulse would be analyzed and stored. The microcomputer would select the nearest object and automatically calculate focus based on the aperture such that the lens would place the nearest object at the near edge of the focus zone. This, of course, selects the focus range to include the selected nearest object and as much of the background as possible. In other camera systems, such as of the type presently marketed by the common assignee of this application wherein the aperture is not manually selected, the range system of the present invention can also be used to select the focus zone. For instance, in cameras using a preliminary brightness detect to predict the maximum aperture based on scene brightness, the brightness detect would determine whether the scene was outdoors or indoors. If there was an outdoor scene, the brightness detect would predict the maximum aperture and a microcomputer would calculate depth of field measured from the nearest object. This would allow setting the lens at the ideal focus position which would place the nearest object at the near edge of the focus zone. If the brightness detect indicated that there was an indoor scene, the range system of the present invention would then use the average range of all the pulses to determine the exposure aperture and then determine the nearest object so as to facilitate calculation of the depth of field whereby the lens system would place the nearest object at the near edge of the zone of focus.

It is believed that the foregoing description fully describes the structure and operation of this embodiment. Since certain changes may be made in the above-described method and apparatus without departing from the scope of the invention herein involved, it is intended that all matter contained in the description or shown in the accompanying drawings shall be interpreted as illustrative and not in a limiting sense.

What is claimed is:

1. A ranging system for controlling photographic apparatus as a function of the range of different portions of a photographic scene, said system comprising:
   means for transmitting ranging energy along at least a path having different portions of a scene which are generally transverse to the direction of the ranging energy;
   means for sensing the presence or absence of ranging energy reflected from said different scene portions along said path; and,
   means responsive to said sensing means for facilitating determination of the range of said different scene portions.

2. A ranging system according to claim 1 wherein said determining means includes means for deriving a selected range signal as a function of the ranges of the different scene portions along said path for facilitating control of the photographic apparatus in accordance with said selected range signal.

3. The system of claim 2 wherein said transmitting means includes means for scanning a narrow beam of energy across a scene for facilitating determination of the range from said system of scene portions lying along a scanning path; and said sensing means includes means for receiving ranging energy reflected from said scene portions, said receiving means including an energy sensing position sensitive device extended in a direction generally parallel to said scanning path, and means for distributing such ranging energy along said device so that energy reflected from all scene portions substantially equidistant from said system are received at substantially the same location on said device while ranging energy from scene portions non-equidistant from said system are spatially distributed along said extended direction of said device, whereby the distance to any given scene portion which reflects energy is a function of the location of its reflected energy along the extended direction of said device.

4. The system of claim 3 wherein said distributing means includes a device lens mounted over said device for focusing the reflected energy on said array and means for providing relative movement in said extended direction between said device lens and said device in coordinated relation to scanning of said beam to produce said same location of received energy from scene portions equidistant from said system and said distributed locations of energy from non-equidistant scene portions.

5. The system of claim 4 wherein said means for providing relative movement comprises means coupling said device lens to said scanning means to coordinate the relative movement of said device lens with said scanning of said beam.

6. The system of claim 5 wherein said scanning means includes an energizeable source of energy, a source lens for facilitating focusing of said energy in said narrow beam, and said distributing means includes means for providing relative movement in the scanning direction between said source lens and said source so as to scan said beam across said scene, and means for coupling together said source lens and said device lens to coordinate the movement thereof.

7. The ranging system of claim 2 wherein said transmitting means includes a plurality of energizeable sources and at least a corresponding plurality of lenses, each of said lenses being positioned over a respective one of said sources so as to direct ranging energy from the respective one of said sources to a separate portion of the scene; and said sensing means includes a position sensitive device and a number of lenses corresponding to the lenses of said transmitting means, wherein each of said lenses of said sensing means is positioned over respective said devices; said sources and said lenses of said transmitting means and said lenses and said arrays of said sensing means being constructed and arranged so that ranging energy directed by any one of said sources is sensed solely by the respective one of said devices.

8. The system of claim 2 wherein said determining means includes means for controlling photographic functions of a photographic apparatus in accordance with said ranges.

9. The system of claim 8 wherein said determining means includes means for deriving a selected range signal as a function of the ranges of the different scene portions for facilitating control of said photographic function control means.

10. The system of claim 9 wherein said means for deriving a selected range signal is operable for deriving said signal as a function of the average of derived ranges of the different scene portions.

11. The system of claim 9 wherein said means for deriving a selected range signal is operable for deriving said signal as a function of the nearest object.

12. The system of claim 9 wherein said means for deriving a selected range signal is operable for deriving said signal as a function of the nearest large object.

13. The system of claim 9 wherein said means for deriving a selected range signal is operable for deriving said signal as a function of the farthest object.

14. The system of claim 9 wherein said means for deriving a selected range signal is operable for deriving said signal as a function of a weighted range signal derived from the ranges of the different scene portions.

15. The system of claim 14 wherein the weighted range signal is a compromise between the range of the nearest and farthest scene portions, but is weighted towards the nearest object.

16. The system of claim 14 wherein the weighted range signal is a compromise between the range of the nearest and farthest scene portions, but is weighted towards the farthest object.

17. The system of claim 14 wherein the weighted range signal is weighted in favor of preselected scene portions along the scanning path.

18. A ranging system for controlling photographic function of a photographic apparatus as a function of the range of different portions of a photographic scene, said system comprising:
means for transmitting ranging energy across a path having different laterally adjacent portions of a scene therealong;
means for sensing the presence or absence of ranging energy reflected from said different scene portions along said path; and,
means responsive to said sensing means for determining the range of said different scene portions and for controlling photographic functions of a photographic apparatus in accordance with said ranges.

19. A ranging system comprising:
means for scanning a narrow beam of energy across a scene for facilitating determination of the range from said system of scene portions lying along a scanning path; and,
means for receiving ranging energy reflected from such scene portions, said receiving means including an energy sensing position sensitive device extended in a direction parallel to the scanning path, and means for distributing such ranging energy along said device so that energy reflected from all scene portions substantially equidistant from said system are received at substantially the same location on said device while ranging energy from scene portions non-equidistant from said system are spatially distributed along said extended direction of said device, whereby the distance to any given scene portion which reflects energy is a function of the location of its reflected energy along the extended direction of said device.

20. The system of claim 19 wherein said distributing means includes a device lens mounted over said device for focusing the reflected energy on said device and means for providing relative movement in said extended direction between said device lens and said device in coordinated relation to scanning of said beam to produce said same location of received energy from scene portions equidistant from said system and said distributed locations of energy from non-equidistant scene portions.

21. The system of claim 19 wherein said means for providing relative movement comprises means coupling said device lens to said scanning means to coordinate the relative movement of said device lens with said scanning of said beam.

22. The system of claim 20 wherein said scanning means includes an energizeable source of energy, a source lens for facilitating focusing of said energy in said narrow beam, and said distributing means includes means for providing relative movement in the scanning direction between said source lens and said source so as to scan said beam across said scene, and means for coupling together said source lens and said device lens to coordinate the movement thereof.

23. The system of claim 20 wherein said scanning means includes a source lens mounted over said source and being movable relative to said source so as to effect said scanning, said source lens being generally synchronously movable with said device lens so that reflected beam energy from the different scene portions strike said device in locations which are a function of the distance the reflected pulses travel whereby scene portions equidistant from said system are substantially coincidental on said device.

24. A method of obtaining ranging information comprising the steps of:
transmitting ranging energy across a ranging path having different laterally adjacent portions of a scene to be ranged;
sensing the presence or absence of reflected ranging energy from the different scene portions; and,
deriving the range of the different scene portions provided by the reflected ranging energy.

25. The method of claim 24 including the step of deriving a selected range signal as a function of the scene portion ranges for facilitating control of a photographic apparatus.

26. A method of obtaining ranging information for controlling photographic functions of a photographic apparatus as a function of the range of different portions of a photographic scene comprising the steps of:
- transmitting ranging energy across a ranging path having different laterally adjacent portions of a scene to be ranged;
- sensing the reflected ranging energy from the different scene portions; and,
- deriving range information of the different scene portions provided by the reflected ranging energy and controlling the photographic functions in accordance with said range information.

27. The method of claim 26 including the step of deriving a selected range signal as a function of the scene portion ranges for facilitating control of a photographic apparatus.

28. The method of claim 26 wherein said deriving step includes selecting a range signal as a function of the average of the derived ranges of different scene portions.

29. The method of claim 27 wherein said selected range signal is a function of a weighted average of the derived ranges of the different scene portions.

30. The method of claim 26 wherein said deriving step includes selecting a range signal as a function of the nearest object.

31. The method of claim 27 wherein said selected range signal is a function of the nearest large scene object.

32. The method of claim 27 wherein said selected range signal is a function of the farthest object.

33. The method of claim 27 wherein said selected range signal is a compromise between the range of the nearest and farthest scene portions, but is weighted towards the nearest object.

34. The method of claim 27 wherein said selected range signal is a compromise between the range of the nearest and farthest scene portions, but is weighted towards the farthest object.

35. The method of claim 27 wherein said selected range signal is weighted in favor of preselected scene portions along the scanning path.

36. The method of obtaining ranging information comprising the steps of:
- scanning a narrow beam of energy across a scene for determining the range from a ranging system of scene portions lying along the scanning path;
- receiving ranging energy reflected from such scene portions by an energy sensing position sensitive device extended in a direction generally parallel to said scanning path; and,
- distributing the ranging energy along the extended direction of the device so that energy reflected from all scene portions substantially equidistant from the system are received at the same location on the device while ranging energy from scene portions non-equidistant from the system are spatially distributed along said extended direction of the device, whereby the distance to any given scene portions is solely a function of the location of its reflected energy on the device.

37. The method of claim 36 wherein said distributing step includes:
- focusing the reflected energy on the array by means of a lens mounted over the device; and,
- providing relative movement between the lens and the device in coordinated relation to scanning of the beam to produce the same location of energy from scene portions equidistant from the system and distributed location of the energy from non-equidistant scene portions.

38. The method of claim 37 wherein said scanning step includes:
- energizing a source of radiant energy;
- focusing of said energy in a narrow beam by a lens assembly;
- relatively moving the source and the lens so as to scan the beam across the scene; and,
- coupling the scanning step and the distributing step to coordinate relative movement thereof so as to produce the same location of energy from scene portions equidistant from the system and distributed location of the energy from non-equidistant scene portions.

* * * * *